Dec. 9, 1941.  M. T. CARPENTER  2,265,964
CATALYTIC CRACKING PROCESS
Filed Jan. 26, 1938
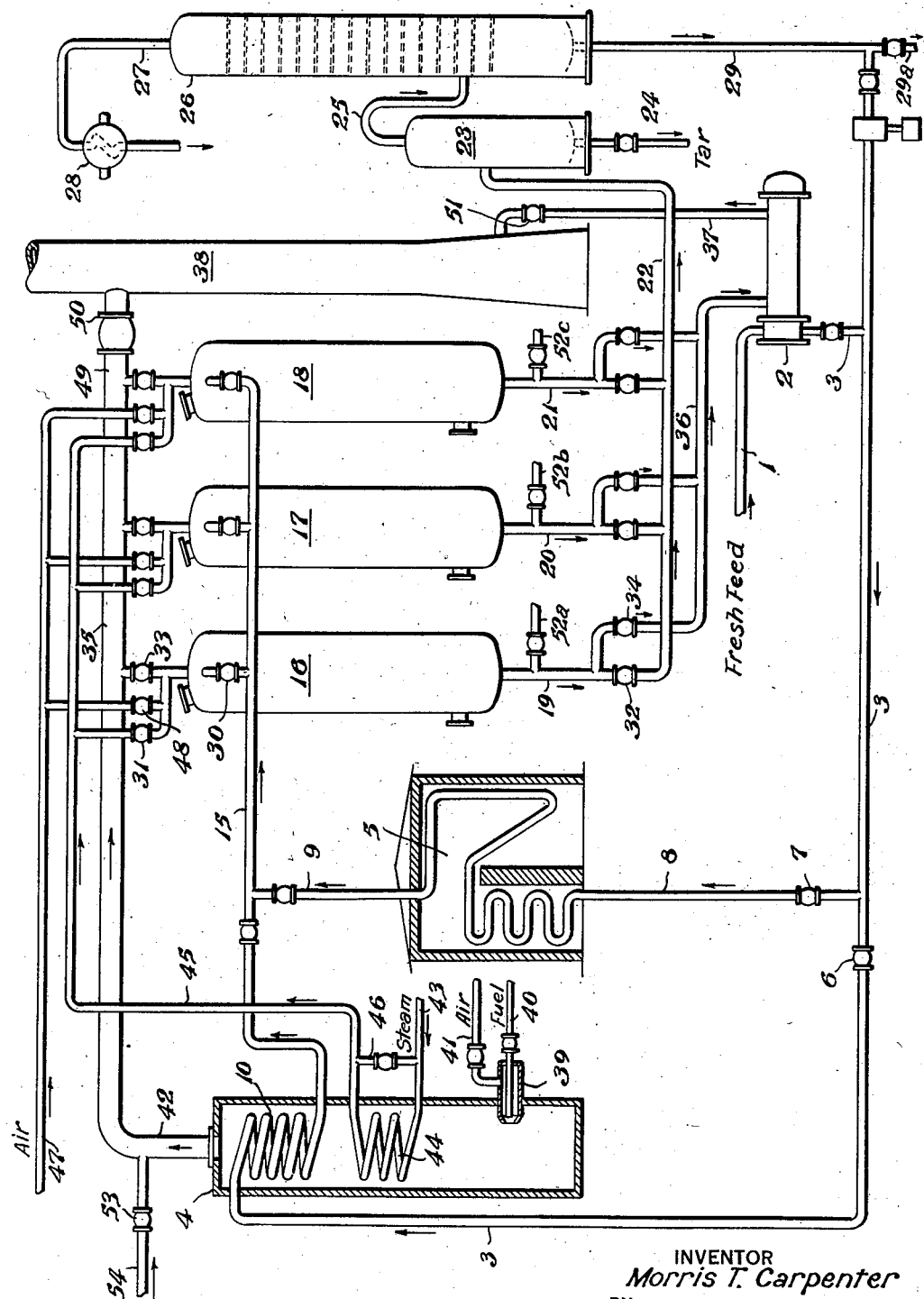
INVENTOR
Morris T. Carpenter
BY
Vanderveer VoorRees
ATTORNEY Patented Dec. 9, 1941

2,265,964

UNITED STATES PATENT OFFICE 2,265,964

CATALYTIC CRACKING PROCESS

Morris T. Carpenter, Chicago, Ill., assignor to Standard Oil Company, Chicago, Ill., a corporation of Indiana Application January 26, 1938, Serial No. 187,098

10 Claims. (Cl. 196—52)

This invention relates to a process for converting hydrocarbon oils, and more particularly to the conversion of petroleum hydrocarbon oils into gasoline motor fuel by the action of catalysts at elevated temperatures. One object of the invention is to effect certain improvements in the conversion of gas oil and similar heavier hydrocarbon oils into gasoline by contact with catalysts wherein the catalyst life is relatively short and frequent regeneration is necessary. A more specific object of the invention is to improve the method of regenerating the catalyst in situ. Still another object of the invention is to control the regeneration of the catalyst to more completely restore its efficiency in less time than ordinarily required in catalytic cracking processes. Other objects of the invention will be apparent from the following description.

The process is described by means of a drawing which shows schematically one embodiment of the invention as applied to the conversion of a typical petroleum oil such as gas oil. Referring to the drawing, fresh feed charging stock, which may consist of virgin gas oil, low octane rating heavy naphtha, etc. may be introduced into the system by line 1 leading to heat economizer 2 where the oil is heated by the heat contained in gases discharged from the system as hereinafter described. The heated oil, which may now be at a temperature of 300 to 600° F., is conducted by line 3 to heaters 4 and 5, the stream of oil being divided between the two heaters by control valves 6 and 7 respectively. Heater 5 is the conventional type of pipe heater, the oil being charged thereto by line 8 and discharged by line 9. In heater 4 the oil is forced through coil 10 disposed within said heater and thence passes by transfer line 15 to the catalytic conversion chambers 16, 17 and 18.

The temperature of the oil in transfer line 15 may suitably be about 800 to 950° F., although in case of heavy naphtha undergoing reforming for improvement of knock rating the temperature may be somewhat higher, e. g., 1000° F. The pressure of the oil vapors introduced into the conversion chambers is preferably slightly greater than atmospheric, for example 10–30 lbs. per sq. in., although somewhat higher pressures may suitably be employed, for example 50–100 lbs. per sq. in. Suitable operating conditions for conversion of gas oil of about 35–38° A. P. I. gravity are about 20 lbs. per sq. in. and 925° F.

The hydrocarbon vapors are conducted alternately to one or more conversion chambers seriatim, the vapor stream being shifted from chamber to chamber as the catalyst therein becomes exhausted.

Chambers 17 and 18 are representative of a number of chambers, the number of which may be five to ten or even more if desired. The conversion chambers are suitably arranged with a false internal perforated catalyst supporting bottom to permit vapors and gases to flow readily through the porous bed of the catalyst. The catalyst may be arranged in granular form, for example 10 to 60 mesh granules, providing sufficient porosity for free flow of vapors therethrough. As catalyst for my process I may employ natural or artificial argillaceous earth, zeolite, etc., fuller's earth, montmorillonite, Death Valley clay, fuller's earth impregnated with a trace of nickel oxide, molybdenum oxide, etc., bauxite, aluminum oxide, aluminum silicate, nickel borate, boron silicate, silica gel impregnated with aluminum hydroxide, kieselguhr, etc. In the case of catalysts which are artificially prepared by precipitation from solutions, etc., I prefer to employ a dehydrated gel form of the catalyst in order to obtain greater activity and longer life. These may be prepared by precipitation of the hydroxide, silicate, etc. followed by drying and washing to remove soluble salts.

From one or more of the catalyst chambers 16, 17 and 18 the treated vapors are conducted by lines 19, 20 or 21 into header 22 leading to separating drum 23. Heavy products, herein refered to as tar, condensing in drum 23 are withdrawn by line 24 and uncondensed vapors are conducted by line 25 to fractionator 26 wherein gasoline and lighter constituents are removed by vapor line 27 leading to condenser 28 and oils heavier than gasoline may be recycled by line 29 back to coil 10 and/or coil 5 where they are suitably heated in conjunction with the fresh feed stock introduced by line 3 or they may be withdrawn by line 29a for separate treatment. If desired line 29 may enter coil 10 and/or coil 5 at an intermediate point where the temperature of the coil is approximately the same as the temperature of the oil withdrawn from fractionator 26.

In the catalytic cracking of heavy oils to gasoline the conversion of the oil into gasoline is always accompanied by the formation of nonvolatile carbonaceous matter which accumulates on the catalyst and after a time destroys its cracking efficiency or deactivates it to such an extent that its use is no longer economical. In order to overcome this difficulty it is necessary to revivify the catalyst at intervals more or less frequent, depending on the character of the oil, temperature, of the vapors, etc. In the case of charging stocks having a relatively high ratio of carbon to hydrogen, the catalyst life is relatively shorter and more frequent revivification must be employed. It is common practice to provide a plurality of catalyst chambers manifolded in such a way that the vapors undergoing cracking may be diverted from one chamber to another and the exhausted catalyst may be revivified by combustion of the carbonaceous matter deposited thereon without removing the catalyst from the reaction chamber. Combustion is effected by passing a stream of air, or air diluted with steam or inert gases, through the catalyst, maintaining a temperature above the kindling temperature, but not sufficiently high to injure the catalyst.

In the prior processes it has been found difficult to control combustion without injuring the catalyst in view of the fact that if the combustion temperature becomes too high, for example 1100 to 1200° F. or higher the catalyst is permanently injured. Various means have been proposed for preventing overheating the catalyst, such as the disposition of heat absorbing surfaces, cooling tubes, etc. through the body of the catalyst for the purpose of conducting away the heat of combustion of the carbonaceous material. One of the chief objections to this method of temperature control is the high cost of construction of the catalyst chambers of this type. Another objection is the difficulty of charging and discharging catalyst from the labyrinthine passages of such an apparatus.

It has been proposed to reduce the rate of combustion by diluting the air supplied to the catalyst chambers but this is objectionable because the resulting low rate of combusting requires a long regeneration time which increases the operating cost as well as the cost of equipment in view of the need of many additional reaction chambers.

In my process I have solved the problem of catalyst regeneration by employing for the regeneration hot flue gases containing excess air from the oil preheating furnace, the temperature of the flue gas being controlled by the regulation of the furnace in the manner hereinafter described.

Referring again to the drawing, when catalyst chamber 16, for example, is exhausted and requires revivification, valves 30, 32, and 34 are closed, valve 52A is opened, and steam is admitted by valve 31, driving all combustible vapors out of the chamber through outlet line 19 and vent 52A. Valves 33 and 34 are opened, allowing hot flue gas from manifold 35 to enter chamber 16, passing out by valve 34 and manifold 36 leading to exchanger 2 and thence by line 37 to stack 38.

Furnace 4 is supplied with heat from burner 39, fuel and air being supplied by lines 40 and 41 respectively. Fuel for this purpose may suitably be fuel oil, gas or other easily controllable combustible material. The amount of fuel may be regulated to produce the desired temperature in the flue gas discharged through line 42 and the amount of air may be controlled to supply substantially the proper combustion conditions in regenerating catalyst chamber 16. It is preferred to regulate the combustion at burner 39 to provide a flue gas in line 42 leading to manifold 35 which will have a temperature of about 600–1000° F., usually about 750–850° F. In general when beginning the regeneration of a catalyst chamber a flue gas in line 42 of lower temperature and lower oxygen concentration is desirable. As the catalyst regeneration proceeds, however, the temperature of the flue gas and its oxygen content may be raised without damaging the catalyst, care being taken to prevent the temperature from descending too low to maintain combustion of the carbonaceous material on the catalyst or going too high and injuring the catalyst. It is also preferred to regulate the air in line 41 to maintain an oxygen concentration of about 0.1 to 10% in the flue gas, the oxygen being kept very low at the beginning of catalyst regeneration and later gradually raised to 1–5% and even 10% at the end of the regeneration cycle.

In order to more closely control temperature and oxygen concentration in the gas supplied to regenerate the catalyst chambers I have provided means for introducing either steam or additional air to the gas entering the catalyst chamber with the flue gas. Steam supplied by line 43 may be superheated in coil 44 and then conducted by line 45 to catalyst chamber 16 controlled by valve 31. The temperature of the steam may be regulated by valved bypass line 46. Additional air may likewise be introduced through manifold 47 and thence to chamber 16 by control valve 48. When the amount of flue gas in duct 42 is greater than that needed for regeneration of catalyst, excess flue gas may be vented by line 49 and valve 50 directly to stack 38.

In operating my process I prefer to supply air and fuel to burner 39 at sufficient pressure to force the combustion products through the remainder of the system. The pressure required for passing the combustion products through the catalyst in chamber 16, for example, may be 5–20 lbs. per sq. in. if the desired rate is to be maintained. I may operate with combustion gases at still higher pressures, for example a pressure of 50 to 100 lbs. may be employed in furnace 4 and certain advantages are obtained thereby. Thus by employing higher pressures I am enabled to absorb the heat of combustion more rapidly from the catalyst because of the greater mass and heat conductivity of the compressed gases. When I am operating my gas regeneration process under pressure I prefer to regulate the gas flow by valve 34 or by valve 51 in line 37. Another result of operating the catalyst regeneration under gas pressure is that the catalyst is subjected to less disturbance, erosion and packing due to high velocity gases passing therethrough. Still another advantage of employing regenerating gas under pressure resides in the improved penetration of the catalyst by the gases being forced directly into the catalyst grains by the increasing pressure. In order to enhance this effect I may cause the pressure to fluctuate considerably during the combustion, particularly during the later stages.

One aim of my process is to pass heated gases through the catalyst in sufficient mass and with a sufficiently low oxygen content to enable the combustion of carbonaceous matter on the catalyst to be effected fairly uniformly throughout the catalyst mass. By my process of supplying gases at a temperature well above the ignition temperature and under pressure I can obtain substantially uniform combustion throughout the catalyst bed, thus avoiding local overheating with injury to the catalyst. It is desirable to have an outlet gas temperature not exceeding about 1000° F. and accordingly I control the oxygen content of the gases introduced into the regenerating catalyst chamber 16 by regulating the air admitted in lines 41 and 47. Also, if the temperature of the combustion gas in line 42 is too high I may introduce wet steam through lines 43, 46, 45 and valve 31, or water may be introduced into line 42 by means of valve 53 and line 54 to control the temperature at the desired point. In order to observe carefully the temperature conditions in the catalyst chambers I prefer to employ a series of thermocouples embeddded in the catalyst at different depths to indicate whether or not uniform combustion is taking place and to insure that the maximum temperature of about 1000° F. is not exceeded.

Although I have described my invention by means of a specific example thereof I intend that it be limited only by the scope of the following claims.

I claim:

1. In the process of converting hydrocarbon oils to produce high antiknock motor fuels boiling within the gasoline boiling range, whereby said oils are heated and vaporized and the vapors are subjected to the action of a solid catalyst disposed in a porous bed and wherein said catalyst is rendered inactive by the deposition of carbonaceous matter thereon, the improvement comprising periodically regenerating said catalyst by hot gases resulting from the combustion of fuel in an excess of air under superatmospheric pressure, absorbing by indirect heat exchange in said hydrocarbon oil undergoing cracking in another catalyst bed a part of the heat generated by said combustion, thereby cooling said combustion gases to a temperature just above the ignition temperature of said carbonaceous matter by regulating the flow of oil in said indirect heat exchange, regulating the oxygen concentration of said combustion gases and subsequently conducting said hot gases through said catalyst bed at a pressure of about 20 to 100 lbs. per square inch.

2. The process of claim 1 wherein the temperature of said hot gases is further controlled by introducing steam before admitting said gases to said catalyst bed.

3. The process of claim 1 wherein the temperature of the gases conducted to said catalyst is maintained approximately within the range of 600 to 1000° F.

4. The process of claim 1 wherein the temperature of the gases conducted to said catalyst is maintained approximately within the range of 750 to 850° F.

5. The process of claim 1 wherein the pressure of the gases introduced into said catalyst bed is maintained at about 50 to 100 pounds per square inch.

6. In the process of cracking hydrocarbon oils to produce high antiknock motor fuels boiling within the gasoline boiling range, wherein said oils are heated and vaporized and the vapors are subjected to the action of a solid cracking catalyst disposed in a porous bed and wherein said catalyst becomes inactive as the result of the deposition of carbonaceous matter thereon, the improvement comprising periodically regenerating said catalyst, without removing it from said bed, by subjecting it to the action of hot oxidizing gases obtained from the combustion of fuel with excess air under superatmospheric pressure regulating the temperature of said hot oxidizing gases by heat exchange with a variable flow of said hydrocarbon oils and maintaining said superatmospheric pressure on said oxidizing gases while in contact with said catalyst.

7. In the process of cracking hydrocarbon oils to produce high antiknock motor fuels boiling within the gasoline boiling range, whereby said oils are heated and vaporized and the vapors are subjected to the action of a solid catalyst disposed in a porous bed and wherein said catalyst is rendered inactive by the deposition of carbonaceous matter thereon, the improvement comprising periodically regenerating said catalyst by hot gases resulting from the combustion of fuel in an excess of air under superatmospheric pressure, absorbing by indirect heat exchange in said hydrocarbon oil undergoing cracking a part of the heat generated by said combustion, thereby cooling said combustion gases controlling the temperature of said gases to maintain it just above the ignition temperature of said carbonaceous matter by controlling the amount of oil in indirect heat exchange with said combustion gases, independently, regulating the oxygen concentration of said combustion gases and subsequently conducting said hot gases through said catalyst bed at said superatmospheric pressure.

8. In the process of cracking hydrocarbon oils to produce high antiknock motor fuels boiling within the gasoline boiling range, whereby said oils are heated and vaporized and the vapors are subjected to the action of a solid catalyst disposed in a porous bed and wherein said catalyst is rendered inactive by the deposition of carbonaceous matter thereon, the improvement comprising periodically regenerating said catalyst by hot gases resulting from the combustion of fuel in an excess of air under superatmospheric pressure, absorbing in said hydrocarbon oils undergoing cracking a part of the heat generated by said combustion, absorbing another part of the heat of said combustion in a current of steam, thereby producing superheated steam, regulating the temperature of said combustion gases at a point just above the ignition temperature of said carbonaceous matter, diluting said combustion gases with said superheated steam, thereby further regulating the temperature of said gases and subsequently conducting said gases through said catalyst bed at a pressure of about 20 to 100 pounds per square inch.

9. In the process of cracking hydrocarbon oils to produce high antiknock motor fuels boiling within the gasoline boiling range, whereby said oils are heated and vaporized and the vapors are subjected to the action of a solid catalyst disposed in a porous bed and wherein said catalyst is rendered inactive by the deposition of carbonaceous matter thereon, the improvement comprising periodically regenerating said catalyst by hot gases resulting from the combustion of fuel in an excess of air under superatmospheric pressure, absorbing in said hydrocarbon oils undergoing cracking a part of the heat generated by said combustion, thereby cooling said combustion gases to a regulated temperature just above the ignition temperature of said carbonaceous matter, subsequently conducting said hot gases through said catalyst bed at a pressure of about 20 to 100 pounds per square inch and causing the pressure of said combustion gases within said catalyst bed to fluctuate repeatedly during the later stages of said regeneration operation.

10. In the process of cracking hydrocarbon oils to produce high antiknock motor fuels boiling within the gasoline boiling range, wherein said oils are heated and vaporized and the vapors are subjected to the action of a solid cracking catalyst disposed in a porous bed and wherein said catalyst becomes inactive as the result of the deposition of carbonaceous matter thereon, the improvement comprising periodically regenerating said catalyst without removing it from said bed by subjecting it to the action of hot oxidizing gases obtained from the combustion of fuel with excess air under superatmospheric pressure, regulating the temperature of said hot oxidizing gases by transferring heat therefrom to said hydrocarbon oils, maintaining said superatmospheric pressure on said oxidizing gases while in contact with said catalyst and causing the pressure of said oxidizing gases to fluctuate during the regeneration operation.

MORRIS T. CARPENTER.